United States Patent

Attali et al.

[11] 3,973,188
[45] Aug. 3, 1976

[54] METHOD AND APPARATUS FOR THE DETERMINATION OF THE THICKNESS OF A MUDCAKE LAYER ON A BOREHOLE WALL TRAVERSING A SUBSURFACE EARTH FORMATION

[75] Inventors: Georges Attali, Houston, Tex.; Pierre Grimaldi, Saint-Maur des Fosses, France

[73] Assignee: Schlumberger Limited, New York, N.Y.

[22] Filed: May 6, 1975

[21] Appl. No.: 575,069

Related U.S. Application Data

[63] Continuation of Ser. No. 324,907, Jan. 19, 1973, abandoned.

[52] U.S. Cl. ................................................ 324/10
[51] Int. Cl.² ...................... G01V 3/18; G01V 3/06
[58] Field of Search .................................. 324/1, 10

[56] References Cited
UNITED STATES PATENTS

| | | | |
|---|---|---|---|
| 2,965,838 | 12/1960 | Kister | 324/10 X |
| 3,075,142 | 1/1963 | Albright et al. | 324/1 |
| 3,136,942 | 6/1964 | Schuster | 324/10 X |
| 3,462,678 | 8/1969 | Eaton | 324/10 |
| 3,579,098 | 5/1971 | Mougne | 324/10 |
| 3,760,260 | 9/1973 | Schuster | 324/10 |

*Primary Examiner*—Gerard R. Strecker

[57] ABSTRACT

An electrical well logging apparatus of the spherical focusing type is suspended in a borehole drilled into an earth formation and is utilized to provide information regarding the thickness of the mudcake formed on the borehole wall.

13 Claims, 12 Drawing Figures

$$P_1 = \frac{R_{mc}I_0}{KE_0} = \frac{R_{mc}}{R_a}$$

$$P_2 = \frac{R_{mc}I_1}{KE_0} = \frac{R_{mc}I_1}{R_a I_0}$$

$$P_3' = \frac{R_{mc}}{KE_0}(I_1 - \lambda I_0)$$

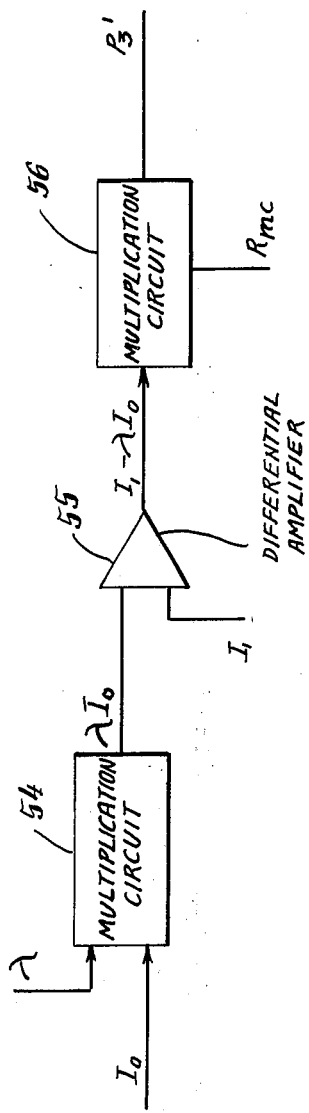
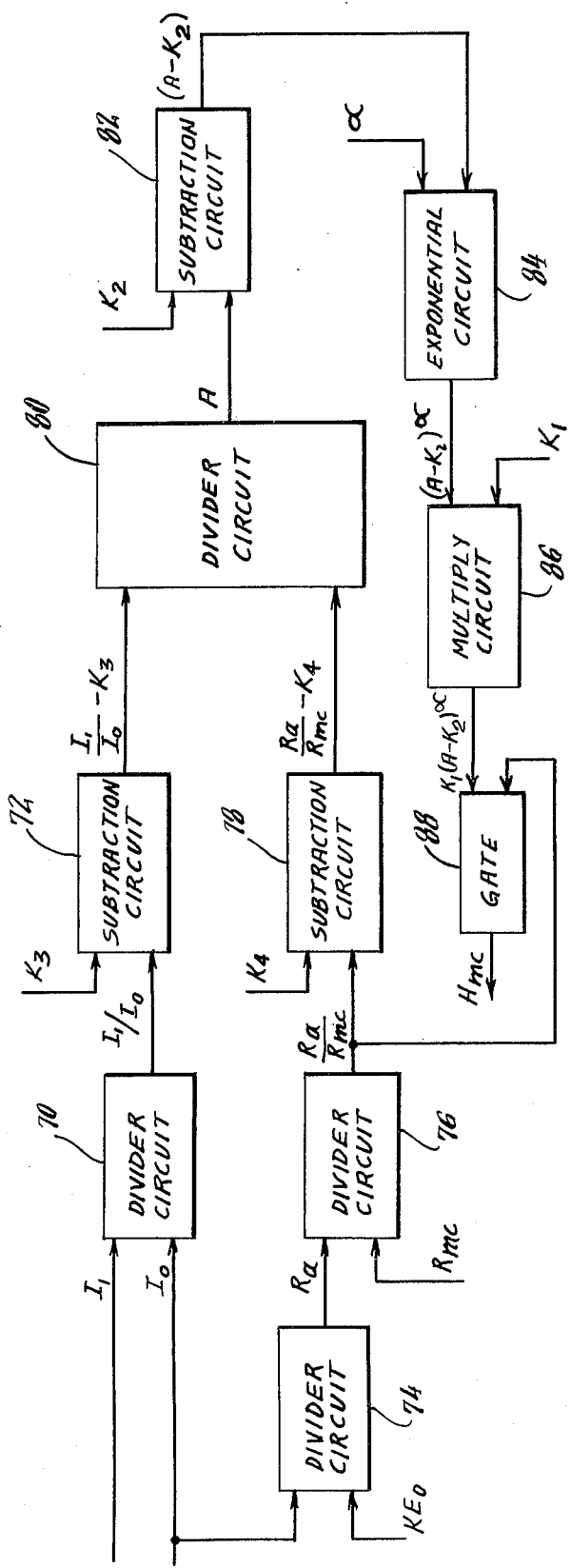

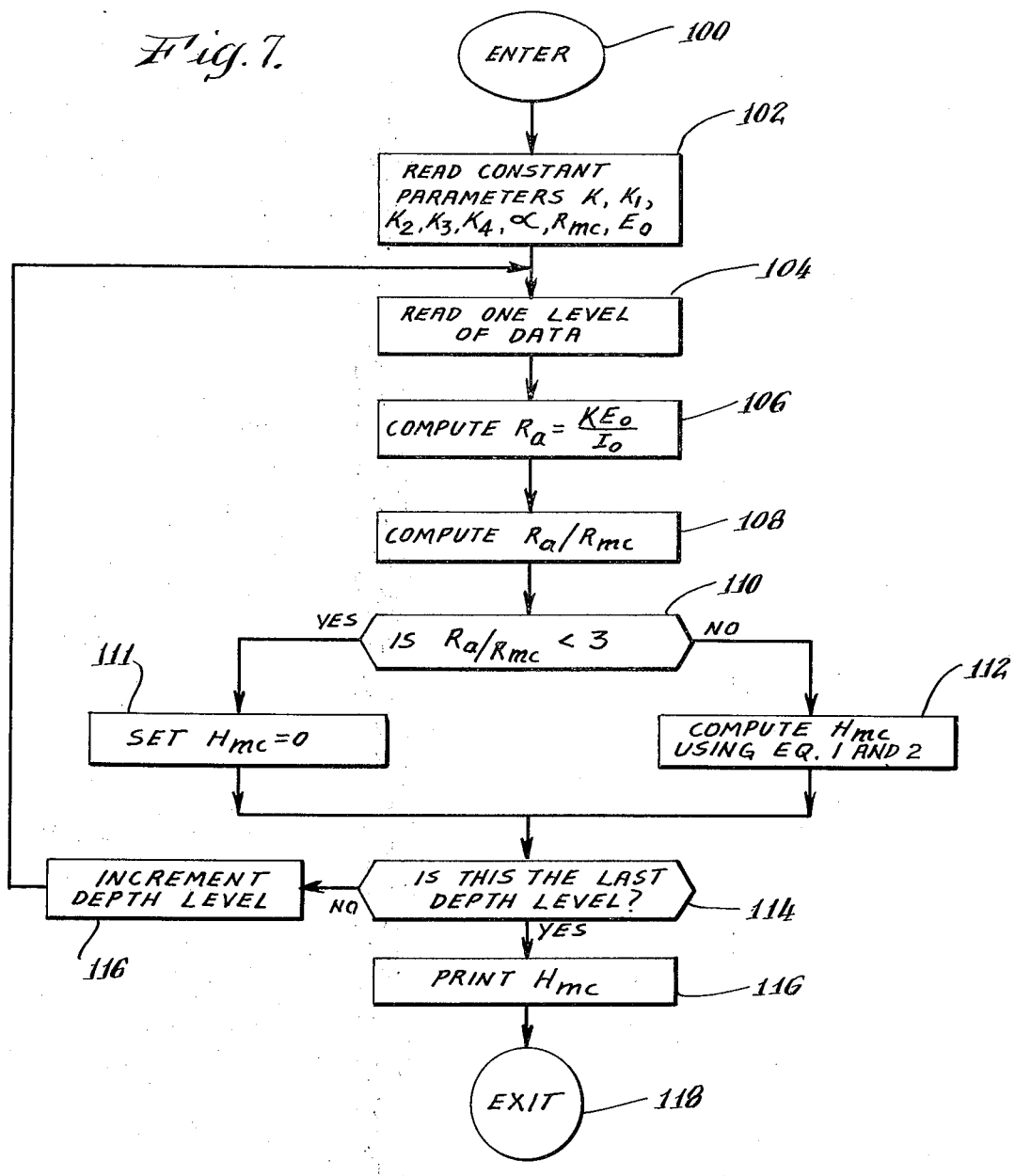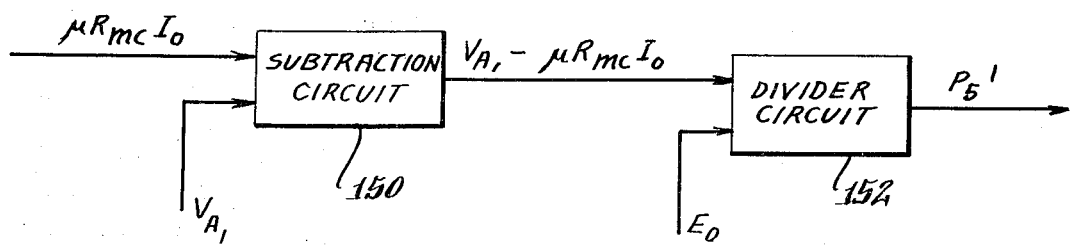

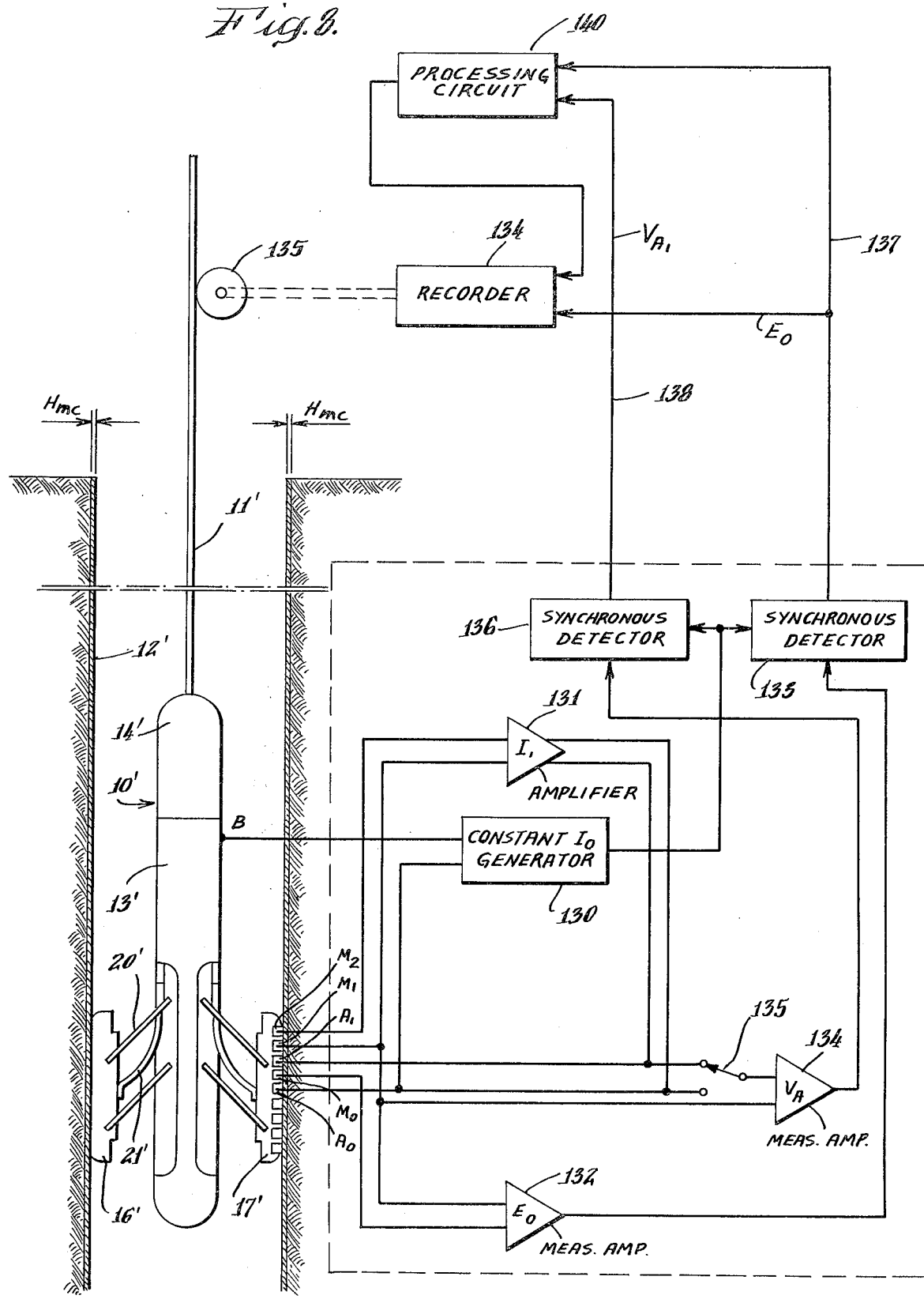

METHOD AND APPARATUS FOR THE DETERMINATION OF THE THICKNESS OF A MUDCAKE LAYER ON A BOREHOLE WALL TRAVERSING A SUBSURFACE EARTH FORMATION

This is a continuation of application Ser. No. 324,907, filed Jan. 19, 1973, now abandoned.

BACKGROUND OF THE INVENTION

This invention relates to well logging methods and apparatus for investigating subsurface formations traversed by a borehole and more particularly to methods and apparatus using pad mounted electrode systems for determining the average lateral thickness of the mudcake existing in zone between the electrodes and the formations.

When drilling a well, it is customary to use drilling muds containing fine solid particles in suspension. As the hydrostatic pressure of the mud column is generally higher than the internal pressure of the formations, this mud has a tendency to penetrate into the permeable formations. A mudcake then forms along the wall of the borehole while a filtrate penetrates into the permeable layers, driving out at least partially the fluid initially contained in these formations. On the other hand, there is practically no mudcake at the level of the impermeable formations in which the mud filtrate does not penetrate. Therefore, knowledge of the presence or absence of this mudcake allows the permeable layers to be differentiated from the impermeable layers.

Moreover, knowing the mudcake thickness makes it possible to determine its influence on the well logging measurements carried out in the borehole. When the mudcake thickness is large, the response of pad mounted well logging apparatus having a small lateral investigation depth is influenced by the characteristics of this mudcake. A correction may then be required in order to obtain the actual characteristics of the formations. In certain cases, the error introduced may be sufficiently great to make the measurement unusable. It is thus very important to determine whether or not the mudcake exceeds a given thickness beyond which the measurement is uncertain and requires a correction. In addition, if the mudcake thickness is known with sufficient accuracy, it is possible to correct the raw reading and thereby increase the utilization range of a given apparatus.

Various apparatus have been proposed to obtain information on the mudcake. One of these, described in the U.S. Pat. No. 3,462,678, comprises a system of electrodes mounted on a pad and capable of measuring the resistivities of two formation zones of different lateral thickness. The resistivity of the zone nearest the borehole is influenced in particular by the presence of the mudcake while the resistivity of the second zone which extends deeper into the formation is relatively less sensitive to the presence of this mudcake. Processing circuits generate a signal indicative of the difference or of the ratio of these two resistivities, thereby providing information on the presence or absence of mudcake and an estimation of its thickness.

The measurement obtained using this technique, however, is not very sensitive to the thickness of the mudcake when this thickness is relatively large. Furthermore, these measurements are influenced by the contrast between the resistivity, $R_{mc}$ of the mudcake and the resistivity $R_{xo}$, of the zone into which the filtrate has penetrated. It is then necessary to introduce a correction factor dependent on the ratio $R_{xo}/R_{mc}$, which factor can only be approximate owing to the fact that the thicker the mudcake, the more difficult it is to obtain the value $R_{xo}$.

Recently, well logging apparatus with electrodes of a new type, sometimes referred to as "spherical focusing" apparatus have been made and described in U.S. patent application Ser. No. 247,076 filed on Apr. 24, 1972 by N. Schuster. In this system, current electrodes associated with AC generators emit from a central electrode a main current $I_0$ and an auxiliary current $I_1$. One of the current generators is controlled by a control loop connected to two potential electrodes, so that the auxiliary current forces the main current to penetrate into the formations. The ratio of the main current $I_0$ to the potential difference $E_0$, measured between two potential electrodes, gives a measurement of the conductivity of a formation zone near the borehole wall, which measurement is only slightly influenced by the resistivity of the mudcake.

SUMMARY OF THE INVENTION

The invention relates to method and apparatus for determining the lateral thickness of a mudcake in a borehole traversing an earth formation.

In accordance with the invention, a method for determining the lateral thickness of the mudcake of formations traversed by a borehole into which a system of current electrodes and potential electrodes is suspended comprises the steps of emitting a main current which flows primarily in the formation surrounding the borehole and an auxiliary current, which flows primarily in the mudcake, generating first and second signals representative of the magnitude of the main and auxiliary currents designated $I_0$ and $I_1$, respectively, combining the first and second signals to produce a third signal representative of the lateral thickness of the mudcake. In one embodiment of the invention the third signal is proportional to $(I_1 - \lambda I_0)$ where $\lambda$ is a constant. In accordance with another embodiment of the invention, the first and second signals are representative of the electrical potential between different electrodes in the electrode system designated $V_A$ and $E_0$ respectively and the third signal is a function of $(V_A - K)/E_0$ where K is a constant. In accordance with still another embodiment of the invention another signal representative of the resistivity of the formation surrounding the borehole is derived and combined with the first and second signals to produce a signal representative of the mudcake thickness.

For a better understanding of the invention, together with further objects and advantages thereof, reference may be made to the following description and to the accompanying drawings.

BRIEF DESCRIPTION OF THE DRAWINGS

FIG. 5 is a schematic representation showing one embodiment of the processing circuit of FIG. 1.

FIG. 6 is a schematic representation showing another embodiment of the processing circuit of FIG. 1.

FIG. 7 is a flow diagram representation of a computer program for determining mudcake thickness.

FIG. 8 is the diagram of another embodiment of a pad mounted apparatus for determining the thickness of the mudcake;

FIG. 12 is a schematic representation showing one embodiment of the processing circuit of FIG. 8.

DESCRIPTION OF THE PREFERRED EMBODIMENTS

Figure 1:
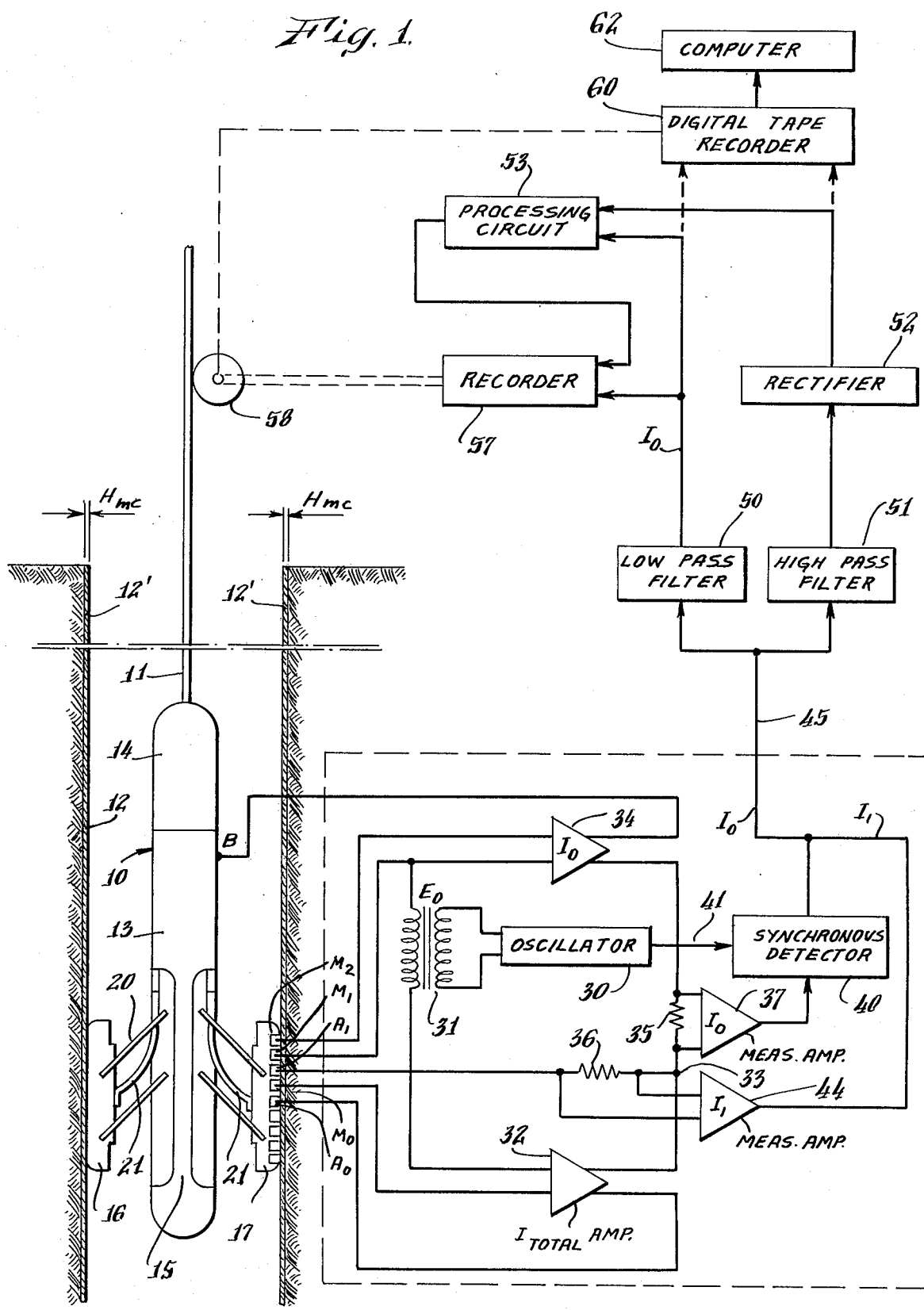
FIG. 1 is the diagram of a pad mounted apparatus according to the invention for determining the thickness of the mudcake.

Referring to FIG. 1, an apparatus 10 according to the invention is represented suspended at the end of a cable 11 in a borehole 12. The borehole wall has a mudcake 12' having thickness $H_{mc}$ formed along the wall thereof. The apparatus 10 can be moved within the borehole in a conventional manner by reeling or unreeling the cable 11 by means of a winch (not shown) located at the surface. The apparatus 10 comprises a body member 13 whose upper part 14 contains electric circuits which will be described later, and whose lower part 15 contains pads 16 and 17 articulated on the body member by means of arms 20. The pads 16 and 17 are adapted to be applied against the wall of the borehole 12, for example by the action of springs 21. These pads may, generally, be retracted along the body member 13 through the action of a conventional hydraulic system (not shown) located in the upper part 14 of the body member 13.

The apparatus 10 shown schematically in FIG. 1 can be constructed according to the technique described in U.S. patent application Ser. No. 52,869 filed on July 7, 1970 by Planche by mounting the pad 17 at the end of a carrying pad which is itself articulated on the body member.

The pad 17 is a measuring pad equipped with current-emitting or current-return electrodes, and potential electrodes. A first electrode $A_0$ is placed substantially at the center of the pad, with four other electrodes $M_0$, $A_1$, $M_1$ and $M_2$ surrounding the central electrode $A_0$ at respective increasing distances from this central electrode. These electrodes can, in particular have a rectangular form such as described in U.S. patent application Ser. No. 247,076 filed on Apr. 24, 1972 by N. Schuster. The body member 13 constitutes a current-return electrode B.

These electrodes are connected to electric circuits contained in the upper part 14 of the body member 13 and which are shown, for greater clarity, in the right-hand part of FIG. 1. These circuits include an oscillator 30 whose output is connected to the primary of a transformer 31. The secondary of the transformer 31 is connected, on the one hand, to the electrode $M_1$, and on the other hand, to an input of a high-gain differential amplifier 32. The other input of the amplifier 32 is connected to the electrode $M_0$. One output of this amplifier is connected to the electrode $A_0$ and the other output to a junction point 33. The electrodes $M_1$ and $M_2$ are connected to the input of a high-gain differential amplifier 34 whose outputs are connected respectively to the electrode B consisting of the body member 13 and to the junction point 33 via a resistor 35 of low resistance. The electrode $A_1$ is also connected to the junction point 33 via a resistor 36 of low resistance. The ends of the resistor 35 are connected to the inputs of an amplifier 37 whose output is applied to a synchronous detector 40. The reference signal from the detector 40 comes from the oscillator 30 via a conductor 41.

The apparatus just described can be recognized as an embodiment of a microresistivity apparatus of the so-called "spherical focusing" type described in greater detail in the aforementioned Schuster U.S. patent application Ser. No. 247,076. In fact, a main current $I_0$ is emitted between the electrode $A_0$ and the electrode B, while an auxiliary current $I_1$ is emitted between the electrode $A_0$ and the electrode $A_1$. A first control loop comprising the high-gain amplifier 34 maintains a zero potential difference between the electrodes $M_1$ and $M_2$. In this system of the "constant voltage" type, a second control loop comprising the amplifier 32 maintains a constant potential difference $E_0$ between the electrode $M_0$ and the electrode $M_1$. It will be noted that in the circuit shown in FIG. 1, the amplifier 32 delivers the total current $(I_1 + I_0)$ while the amplifier 34 delivers the current $I_0$ although the latter is connected between the electrodes $A_1$ and B. Other equivalent circuits would, of course, be possible by differently connecting the outputs of the amplifiers 32 and 34 to the electrodes $A_0$, $A_1$ and B. For example, it would be possible to connect the outputs of the amplifier 34 to the electrodes $A_0$ and $A_1$ and the outputs of the amplifier 32 to the electrodes $A_0$ and B, these two amplifiers 34 and 32 then respectively supplying the currents $I_1$ and $I_0$. However, preference has been given to the circuit of FIG. 1 which makes it possible to reduce the gain of the amplifiers and, in particular, that of the amplifier 34, with identical results.

Amplifier 37 delivers an AC signal representative of the main current $I_0$ whose component in phase with the voltage $E_0$ is rectified in the synchronous detector 40. As the voltage between the electrodes $M_0$ and $M_1$ is kept constant and equal to $E_0$, the DC voltage appearing at the output of the detector 40 is proportional to the ratio $I_0/E_0$; i.e., representative of the conductivity of a formation zone near the measuring pad 17 traversed by the main current $I_0$. Owing to the first control loop, the auxiliary current $I_1$ forces the main current $I_0$ to penetrate into the formations. Because of this, the output voltage of the detector 40 is relatively uninfluenced by any mudcake which may be located between the pad and the permeable formations, at least as long as the thickness of this mudcake is not excessive.

In addition, the apparatus of FIG. 1 comprises circuits adapted to provide an indication on the thickness of the mudcake. These circuits include a measurement amplifier 44 whose input is connected to the ends of the resistor 36 and whose output signal is an AC voltage proportional to the auxiliary current $I_1$. The output signals of the detector 40 and of the amplifier 44 are transmitted to the surface via a single conductor 45 of the cable 11. The two signals $I_0$ and $I_1$ are separated on the surface by a low-pass filter 50 and a high-pass filter 51, the latter being connected to a rectifier 52.

For better accuracy, it is possible to replace the rectifier 52 by a synchronous detector so as to rectify only the component of the auxiliary current $I_1$ in phase with the voltage $E_0$. The error introduced by the absence of synchronization is not critical since a very high accuracy is not required for measuring the thickness of the mudcake. On the other hand, the use of a synchronous downhole detector would require two conductors for transmitting $I_1$ and $I_0$ to the surface, both of which would appear in the form of DC voltages.

The outputs of the low-pass filter 50 and of the rectifier 52 are connected to a processing circuit 53 adapted to combine the two signals $I_0$ and $I_1$ and provide an output signal representative of the mudcake thickness. The operation of processing circuit will be described in greater detail below.

The signal from processing circuit 53 is applied to a recorder 57 which is driven by wheel 58 in tangential friction with cable 11. Thus, the signal representative of the mudcake thickness is recorded as a function of depth. In addition, since the signal derived from low-pass filter 50 is representative of the conductivity of the formation, recorder 57 can simultaneously record signals representative of the formation conductivity and mudcake thickness.

Alternatively, the output signals from low-pass filter 50 and rectifier 52 can be applied to a digital tape recorder 60 which is driven by wheel 58. The digital tape recorder converts the signals to digital form for recording on magnetic tape. The tape is then carried to digital computer 62 or transmitted to the computer via telemetry link. The computer is programmed to provide an output signal representative of the mudcake thickness.

Figure 2:
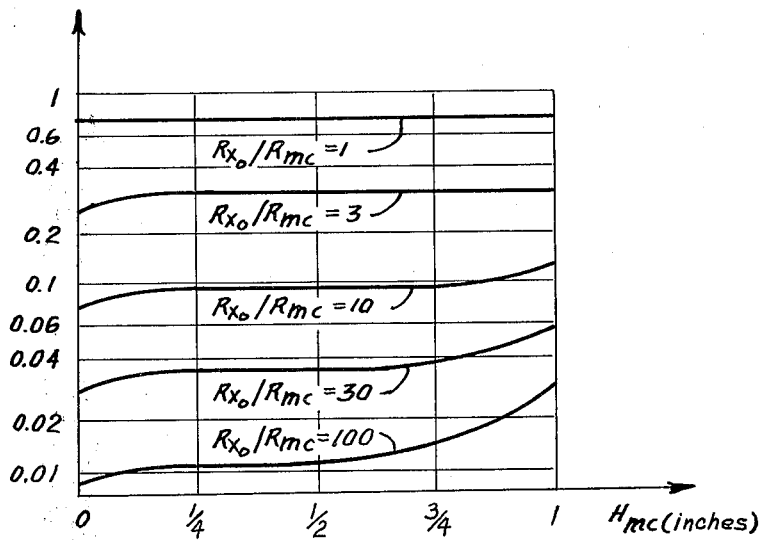
FIGS. 2, 3 and 4 are curves representing, in relation to the thickness of the mudcake, the variations of different parameters which are functions of the auxiliary current $I_1$, of the main current $I_0$ and of the potential difference $E_0$, measured during the testing of the apparatus of FIG. 1.
Figure 3:
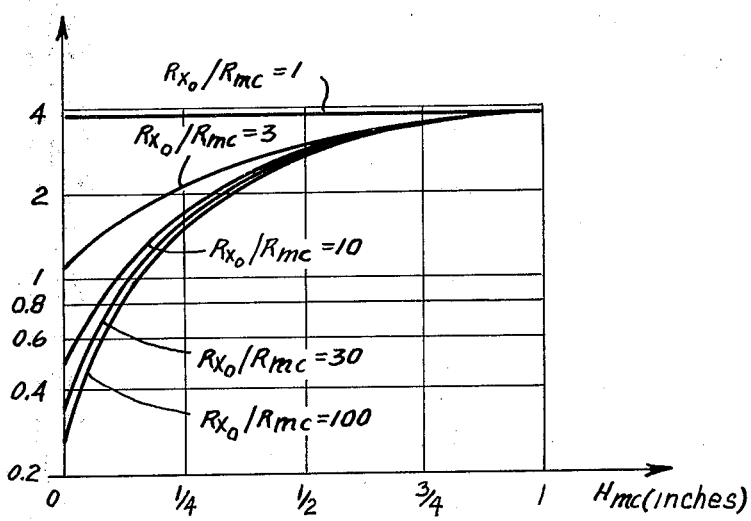
Figure 4:
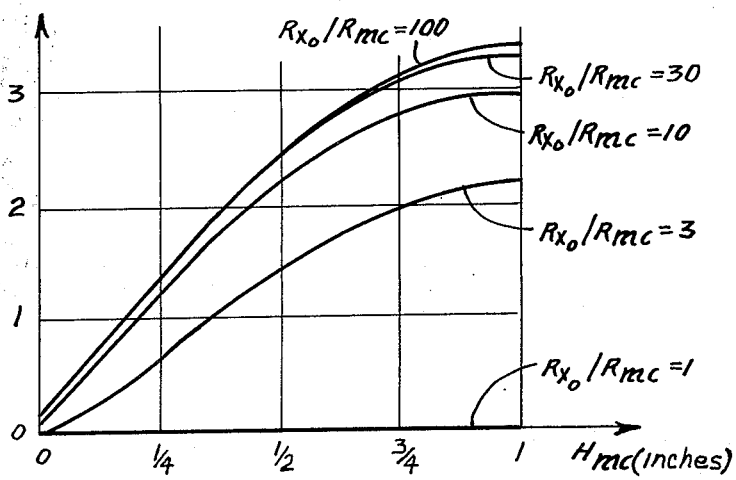

For a better understanding of the invention, refer to FIGS. 2, 3 and 4 which represent variations, as a function of mudcake thickness, of different parameters which are functions of the main current $I_0$, of the auxiliary current $I_1$ and of the voltage $E_0$. FIG. 2 represents in semi-logarithmic coordinates the variations of a parameter $P_1 = R_{mc}I_0/KE_0$, as a function of the thickness of the mudcake $H_{mc}$, for different values of the contrast $R_{xo}/R_{mc}$, the term $R_{xo}$ representing the resistivity of the zone invaded by filtrate, $R_{mc}$ the resistivity of the mudcake and K as a coefficient which depends on the configuration of the electrodes. The parameter $P_1 = R_{mc}I_0/KE_0$ can also be written $R_{mc}/R_a$, with the term $R_a$ being the resistivity of formation read by the apparatus of FIG. 1. These curves confirm that the resistivity $R_a$ read by the apparatus of FIG. 1 is practically equal to the true resistivity $R_{xo}$ of the zone invaded by filtrate, as long as the mudcake thickness $H_{mc}$ is smaller than about ¾ inch. Beyond this thickness, the curves bend and the resistivity $R_a$ is influenced by the mudcake, to an extent dependent upon the contrast $R_{xo}/R_{mc}$.

Due to the fact that the auxiliary current $I_1$ flows mainly in the mudcake, it was thought that the measurement of this current $I_1$ could permit an indication on the mudcake thickness to be obtained. FIG. 3 represents the variations, in semi-logarithmic coordinates, of a parameter $P_2 = R_{mc}I_1/KE_0$ as a function of the mudcake thickness $H_{mc}$, for different values of the contrast $R_{xo}/R_{mc}$. If one wishes to use the parameter $P_2$ as a measurement of the mudcake thickness, the curves of FIG. 3 show several advantages. First of all, this parameter $P_2$ is a monotone and almost linear function of $H_{mc}$. Moreover, for contrasts of $R_{xo}/R_{mc} > 10$, which are encountered most often in practice, this parameter depends little on the value of this contrast, the curves between $R_{xo}/R_{mc} = 10$ and $R_{xo}/R_{mc} = 100$ in fact being very similar. On the other hand, this parameter $P_2$ exhibits several disadvantages as a measurement of $H_{mc}$.

Firstly, it does not vary greatly as the mudcake thickness increases over $H_{mc} = ¾$ inch. Moreover, this parameter indicates a large mudcake thickness when $R_{xo} = R_{mc}$ whatever the actual thickness of mudcake. This property is very troublesome because contrasts near 1 are often encountered at the level of the clays which have a low resistivity and which have no mudcake. In other words, this parameter will not make it possible to differentiate, in certain unfavorable cases the clays from the permeable formations covered with a mudcake of great thickness.

According to the invention, the two parameters of FIGS. 2 and 3 are combined so as to obtain a third parameter not exhibiting the above mentioned defects. Ideally, this third parameter must take on a zero value when $H_{mc} = 0$, irrespective of the values of the contrast $R_{xo}/R_{mc}$ and it should not be sensitive to the variations of the contrast $R_{xo}/R_{mc}$. By studying the parameters $P_1$ and $P_2$, it has been found that for a zero mudcake thickness $P_2 = \lambda_1 P_1 + \lambda_2$ when the contrast $R_{xo}/R_{mc}$ varies, which can be rewritten as $I_1/I_0 = \lambda_1 + \lambda_2 R_a/R_{mc}$. Consequently, by choosing a new parameter $P_3 = P_2 - \lambda_1 P_1 - \lambda_2$, the variations of this parameter $P_3$ as a function of mudcake thickness $H_{mc}$ will be represented by a family of curves all passing approximately through the origin. In practice, it is possible to neglect the coefficient $\lambda_2$ and to choose a parameter of the form $P'_3 = P_2 - \lambda P_1$ in which $\lambda$ is a constant coefficient close to the value which $I_1/I_0$ takes on when $R_{xo}/R_{mc} = 1$, that is, when the measuring pad is placed in a homogeneous medium. Since in this case $R_a/R_{mc}$ is also near 1, this value of $I_1/I_0$ is approximately equal to $(\lambda_1 + \lambda_2)$.

FIG. 4 represents, in linear coordinates, the variations of the parameters $P'_3$ as a function of the mudcake thickness, for different values of the contrast $R_{xo}/R_{mc}$. As explained earlier this parameter is practically equal to zero for a thickness $H_{mc}$ equal to zero, whatever the value of the contrast $R_{xo}/R_{mc}$. It is moreover observed that in the most frequently encountered conditions, where the contrast $R_{xo}/R_{mc}$ is greater than 10, the curves are very close to each other, which means that the parameter $P'_3$ is practically independent of the value of the contrast $R_{xo}/R_{mc}$. Thus the value of the parameter $P'_3$ will be representative of the mudcake thickness on the borehole wall. Referring now to FIG. 5, there is shown an embodiment of processing circuit 53 for providing the parameter $P'_3$.

Referring now to FIG. 5, the output signal of lowpass filter 50 is applied to a multiplication circuit 54 whose output is connected to the input of a differential amplifier 55. The other input of the amplifier 55 is connected to the output of the rectifier 52. The output of the amplifier 55 is applied to a multiplication circuit 56 with a variable coefficient $R_{mc}$ which may be in the form of a manually controlled potentiometer dividing the input signal by an adjustable coefficient $1/R_{mc}$, proportional to the conductivity of the mudcake. The output of multiplication circuit 56 is the parameter $P'_3$ which is applied to the recorder as described above.

Owing to the fact that the potential difference $E_0$ is kept constant in the apparatus of FIG. 1, it is sufficient to perform the calculation $R_{mc}(I_1 - \lambda I_0)$, the coefficient $R_{mc}$ (or $1/R_{mc}$) being introduced manually into the circuit 56 from a measurement made at the surface on the mud or on the mudcake itself. It will be noted that an error on the value of $R_{mc}$ will not make the recorded curve unusable, but will be equivalent to a scale change which may be corrected subsequently if one obtains a more exact value of the resistivity $R_{mc}$ of the mudcake.

From a study of the curves of FIGS. 2–4 it has been found that a value of the mudcake thickness can be computed. Thus, for $R_a/R_{mc}$ less than 3, $H_{mc}$ is set equal to zero. When $R_a/R_{mc}$ is greater than 3, $H_{mc}$ can be computed according to:

$$H_{mc} = K_1 (A-K_2)^\alpha \qquad (1)$$

Where $K_1$, $K_2$ and $\alpha$ are predetermined constants and A is given by the equation:

$$A = \frac{\frac{I_1}{I_0} - K_3}{\frac{R_a}{R_{mc}} - K_4} \qquad (2)$$

Where $K_3$ and $K_4$ are predetermined constants. As an example, $K_1$ is equal to 0.125, $K_2$ is equal to 0.2, $\alpha$ is equal to 1.8, $K_3$ is equal to 5 and $K_4$ is equal to 1. An embodiment of processing circuit 53 for determining $H_{mc}$ is shown in FIG. 6.

Referring now to FIG. 6, the output signal of lowpass filter 50 $I_0$ and the output signal for rectifier 52 $I_1$ are applied to divider circuit 70. The output of divider circuit 70 which is $I_1/I_0$ is applied to subtraction circuit 72 where $K_3$ is subtracted therefrom. The output of low-pass filter 50 is also applied to divider circuit 74. The other input to divider circuit 74 is $KE_0$ which is divided by $I_0$ to produce a signal representative of $R_a$. This signal is applied to divider circuit 76 which also has as an input the predetermined value of $R_{mc}$. The predetermined constant $K_4$ is then subtracted from the ratio $R_a/R_{mc}$ in subtraction circuit 78, after which the outputs of circuits 72 and 78 are applied to divider circuit 80. The output of divider circuit 80 is equal to the parameter A given by equation 2.

The predetermined constant $K_2$ is then subtracted from the parameter A in subtraction circuit 82 after which the value is raised to the $\alpha$ power by the exponential circuit 84. This value is then multiplied by the predetermined constant $K_1$ in multiplication circuit 86. The output of multiplication circuit 86 and of divider circuit 76 are than applied to gate 88. Gate 88 will provide an output when the value of a $R_a/R_{mc}$ is greater than 3. Thus, if the output of divider circuit 76 is less than 3, the output of gate 88 will be zero while if the output from divider circuit 76 is greater than 3 the output of gate 88 will be equal to the value of $H_{mc}$ as given by Equation 1. This value of $H_{mc}$ can then be applied to recorder 57 for recording the value of the mudcake thickness as a function of depth.

The value of $H_{mc}$ can also be obtained by use of an appropriately programmed general purpose computer. Referring to FIG. 7, there is shown a flow diagram representation of a computer program for performing this operation. The program is entered via block 100 after which the constant parameters K, $K_1$, $K_2$, $K_3$, $K_4$, $\alpha$, $R_{mc}$, and $E_0$ are read block 102. Next as represented by block 104 one level of data is read after which the resistivity $R_a$ is computed according to the equation $R_a = KE_0/I_0$ (block 106). Next, the ratio $R_a/R_{mc}$ is computed as represented by block 108 and if this ratio is less than 3 which question is asked by decision element 110 the value of $H_{mc}$ is set equal to 0 block 111. If the value of the ratio of $R_a/R_{mc}$ is not less than 3, NO answer from decision element 110 the value of the mud cake thickness is computed using Equations 1 and 2 as represented by block 112. Next decision element 114 asks if this is the last depth level and if it was not, NO answer, the depth level is incremented 116 and the program returns to block 104 to process the next level of data. If this was the last depth level, YES answer from decision element 114 the values for $H_{mc}$ are printed out as represented by clock 116 and the program exits block 118.

FIG. 8 represents another embodiment of the invention in which, for determining mudcake thickness, use is made of the potential of an auxiliary current electrode. For this embodiment a design of the constant current $I_0$ type has been chosen. The apparatus 10' comprises the same elements as the apparatus 10, designated by references bearing a prime. Only the electrical circuits are different These circuits comprise a constant AC generator 130 whose output is connected to the electrodes $A_0$ and B. The electrodes $M_1$ and $M_2$ are connected to the inputs of a high gain differential amplifier 131 whose outputs are connected to the electrodes $A_0$ and $A_1$. Electrodes $M_0$ and $M_1$ are connected to the inputs of a measurement amplifier 132 whose output signal is applied to a synchronous detector 133 which also receives a reference signal from the current generator 130.

This will be recognized as a microresistivity device with spherical focusing of the type with a constant main current. In fact, the constant current generator 130 delivers the main current $I_0$. A control loop comprising the amplifier 131 slaves the auxiliary current $I_1$ so as to maintain a zero potential difference between the electrodes $M_1$ and $M_2$, the auxiliary current $I_1$ thus forcing the main current $I_0$ to penetrate into the formations. The amplifier 132 delivers an alternating voltage representative of the potential difference $E_0$ between the electrodes $M_0$ and $M_1$, and the component of this voltage in phase with the current $I_0$, rectified in the synchronous detector 133, is proportional to the ratio $E_0/I_0$, and thus representative of the resistivity of a formation zone near the pad 17' and traversed by the current $I_0$.

Like the apparatus of FIG. 1, the device of FIG. 8 comprises circuits adapted to give an indication of the mudcake thickness. These circuits comprise a measurement amplifier 134. One input of this amplifier is connected to the electrode $M_1$ and the other to an inverter 135 whose mobile contact connected to the electrode $A_1$ can be connected alternatively to the electrode $A_0$. The output of the amplifier 134 is connected to a synchronous detector 136 whose reference signal is delivered by the generator 130. The output signal of the detector 136 is representative of the potential difference $(V_{A_1} - V_{M_1})$, which will hereinafter be called $V_{A_1}$, because the potential of the electrode $M_1$ (or $M_2$) can be considered to be zero.

It is possible to eliminate the synchronous detector 136 and to directly connect the output of the measurement amplifier 134 to a rectifier located on the surface. By eliminating the synchronization a slight error is introduced which, however, is not critical. On the other hand, such an arrangement makes it possible to reduce the number of conductors in the cable 11' used for the transmission because the two signals, one DC, the other AC, can be transmitted on the same conductor and then separated by appropriate filters as in the case of FIG. 1.

The outputs of the detectors 133 and 136 are connected via conductors 137 and 138 of the cable 11 to a processing circuit 140 adapted to combine the two signals $E_0$ and $V_{A_1}$ and provide an output signal representative of the mudcake thickness. This circuit is described in detail below.

The output signal of the processing circuit is applied to recorder 134 driven according to the depth by means of a wheel 135 in tangential friction with cable 11'. The recorder also receives the output signal of the synchronous detector 133, thus simultaneously recording as a function of depth a signal representative of the resistivity of a zone near the wall of the borehole and a second signal representative of the thickness of the mudcake. Alternatively, the signals from detectors 133 and 136 could be applied to a digital tape recorder and subsequently processed by an appropriately programmed general purpose computer as shown in detail in FIG. 1.

Figure 9:
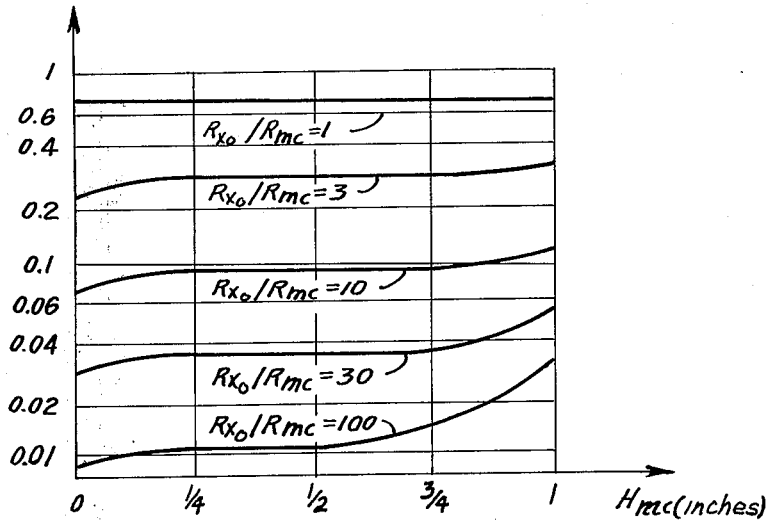
FIGS. 9, 10 and 11 are curves representing, in relation to the thickness of the mudcake, the variations of different parameters which are functions of the potential $V_{A_1}$, of the main current $I_0$ and of the potential difference $E_0$ measured during the testing of the apparatus of FIG. 8.

For a better understanding of the operation of the apparatus of FIG. 8, FIGS. 9, 10 and 11 show the variations, as a function of mudcake thickness of different parameters which are functions of the main current $I_0$ and of the potential differences $V_{A_1}$ and $E_0$. FIG. 9 represents, in semi-logarithmic coordinates, the variations in the parameter $P_1 = R_{mc}I_0/KE_0$, which are evidently identical to those of FIG. 2, the operation of the apparatus of FIG. 8 being equivalent to that of the apparatus of FIG. 1. For the same reason, parameters $P_2 = R_{mc}I_1/KE_0$ and $P'_3 = (I_1 - \lambda I_0) R_{mc}/KE_0$, measured for the apparatus of FIG. 8 would be represented by curves identical to those of FIGS. 3 and 4.

Figure 10:
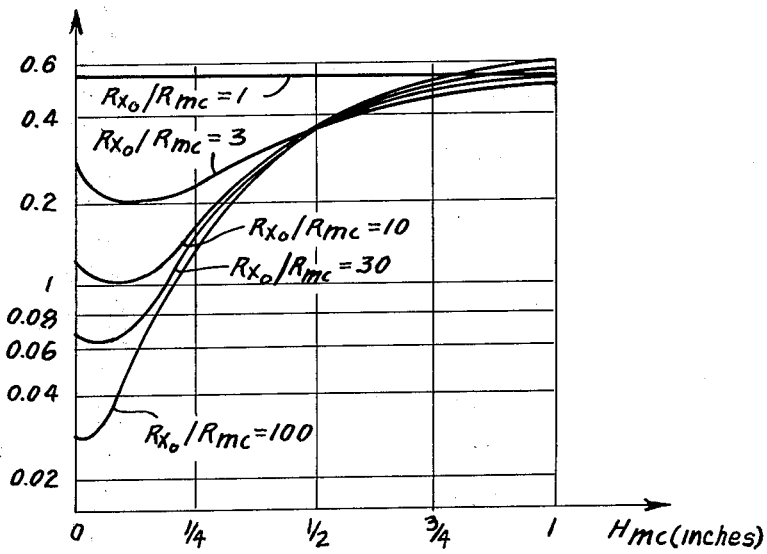

Like the measurement of the auxiliary current $I_1$, it was thought that the measurement of the potential of one of the electrodes $A_0$ or $A_1$ could make it possible to obtain an indication on the thickness of the mudcake. FIG. 10 represents, in semilogarithmic coordinates, the variations in a parameter $P_4 = V_{A_1}/E_0$ as a function of mudcake thickness $H_{mc}$, for different values of the contrast $R_{x0}R_{mc}$. If one wishes to use the parameter $P_4$ as a measurement of the thickness of the mudcake, the curves of FIG. 10 show that this parameter includes the same advantages and disadvantages as the parameter $P_2$ examined previously with reference to FIG. 3. The parameter $P_4$ has, moreover, the disadvantages of decreasing for increasing mudcake thicknesses when these thicknesses are lower than ⅛ inch. It will be seen later that this disadvantage is not critical.

Just as the parameters $P_1$ and $P_2$ were combined, it is possible to combine $P_1$ and $P_4$ so as to obtain a parameter $P_5$ not having the drawbacks of $P_4$. By examining the parameters $P_1$ and $P_4$, it was found that for a small mudcake thickness (about 1/16 inch), $P_4$ is not very different from a linear function of $P_1$, of the form $P_4 = \mu_1 P_1 + \mu_2$ when the contrast $R_{x0}/R_{mc}$ varies, which equation can also be written $KV_{A_1}/R_{mc}I_0 = \mu_1 + \mu_2 R_a/R_{mc}$. Consequently, by choosing a new parameter $P_5 = P_4 - \mu_1 P_1 - \mu_2$, the variations in this parameter as a function of mudcake thickness $H_{mc}$ will be represented by a family of curves all passing approximately through zero for a mudcake thickness $H_{mc}$ of the order of 1/16 inch. In practice, the coefficient $\mu_2$ can be neglected and a parameter of the form $P'_5 = P_4 - \mu'P_1$ can be selected in which $\mu'$ is a constant coefficient near the value which is taken on by $KV_{A_1}/R_{mc}I_0$ when $R_{x0}/R_{mc} = 1$, i.e. when the measuring pad is placed in a homogeneous medium. Since, in this case, $R_a/R_{mc}$ is also near 1, this value of $KV_{A_1}/R_{mc}I_0$ is approximately equal to $(\mu_1 + \mu_2)$. In one embodiment of the apparatus of FIG. 8, the output signal of processing circuit 140 is representative of the parameter $P'_5 = (V_{A_1} - \mu R_{mc}I_0)/E_0$ for which $\mu = \mu'/K$. The processing circuit for obtaining this output signal is shown in detail in FIG. 12.

Referring now to FIG 12, the constant $\mu R_{mc}I_0$ is applied as one input to subtraction circuit 150. The other input to the subtraction circuit is $V_A$, the signal from synchronous detector 136. The output of subtraction circuit 150 is applied to divider circuit 152. The other input to circuit 152 is the signal $E_0$ from synchronous detector 133. The output from divider circuit 152 is $P'_5$ which is applied to recorder 134 which records the signal as a function of depth.

Figure 11:
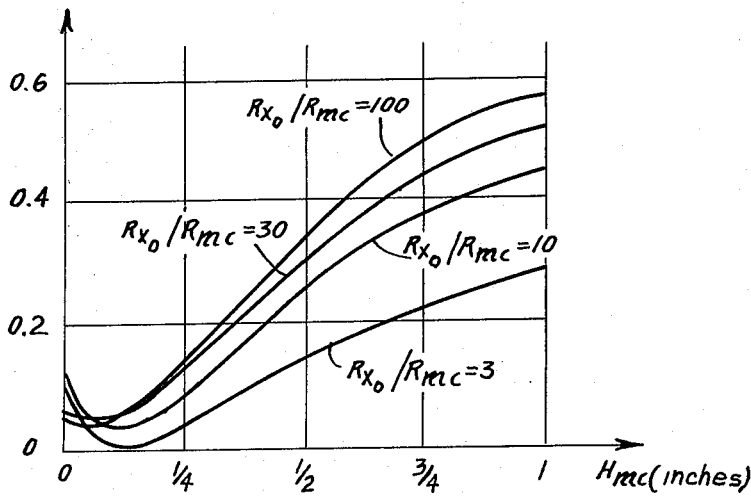

FIG. 11 represents, in linear coordinates, the variations in the parameter $P'_4$ as a function of mudcake thickness for different values of the contrast $R_{x0}/R_{mc}$. It is noted that this parameter has substantially the same advantages as the parameter $P'_3$ of FIG. 4. In particular, it is very close to zero for a thickness $H_{mc}$ of 1/16 inch whatever the value of the contrast $R_{x0}/R_{mc}$. Moreover, under the conditions most frequently encountered in which the contrast $R_{x0}/R_{mc}$ is higher than 10, the curves are very similar to each other, which means that the parameter $P'_5$ is practically independent of the value of the contrast $R_{x0}/R_{mc}$. This parameter will thus give an indication on the mudcake thickness under the same conditions as the parameter $P'_3$.

This parameter $P'_5$ appears, however, to have a drawback compared with the parameter $P'_3$. In fact, for small mudcake thicknesses, i.e., smaller than 1/16 inch, $P'_5$ increases as $H_{mc}$ decreases thereby apparently introducing an ambiguity in the measurement of $H_{mc}$ because the same value of $P'_5$ corresponds to two different mudcake thicknesses. In practice, as a film of mud always remains between the pad and the wall of the borehole, this rise in the curves is not observed when $H_{mc}$ decreases from ⅛ inch to zero. Consequently, there is no ambiguity for obtaining $H_{mc}$. However, the parameter $P'_5$ does not allow a distinction to be made between small mudcake thicknesses (smaller than ⅛ inch).

Equations 1 and 2 above can provide a value of mudcake thickness from the signals derived by the apparatus of FIG. 8 if $I_1$ is set, for example, equal to $V_{A_1}/2.75 R_{mc}$. It is apparent that the processing circuit to perform this operation is similar to that shown in FIG. 6. Similarly, the magnitude of the mudcake thickness can be obtained by use of an appropriately programmed general purpose computer. The flow diagram for such a program would be similar to that shown in FIG. 7.

It will be noted that in the case of an apparatus with constant voltage $E_0$, such as that of FIG. 1, the parameter $P'_5$ could be easily obtained by detecting $V_{A_1}$ and $I_0$ and by calculating the expression $(V_{A_1} - \mu R_{mc}I_0)$ which is a linear relationship between $V_{A_1}$ and $I_0$. Likewise, the parameter $P'_3$ could be used in a constant current $I_0$ apparatus by calculating an expression of the form $(I_1 - \lambda'') R_{mc}/E_0$ where $\lambda''$ is a constant proportional to $I_0$.

Throughout the preceding discussion it was assumed that the potential $V_{A_1}$ of the electrode $A_1$ was detected. It was found that similar results were obtained by detecting the potential $V_{A_0}$ of the electrode $A_0$. In particular, the curves representing a parameter $P_6 = V_A E_0$ in relation to the mudcake thickness $H_{mc}$ have an appearance very similar to the curves of FIG. 10. Likewise, it is possible to find a parameter of the form $P_7 = P_6 = \gamma_1$ $P_1 - \gamma_2$, such that $P_7$ is approximately zero for $H_{mc}$ close to zero whatever the value of the contrast $R_{xo}/R_{mc}$. However, in the case, it is no longer possible to neglect the term $\gamma_2$ and it will be necessary to use, as a measurement of the mudcake thickness, the parameter $P_7$ of the form $(V_{A_0} - \gamma_1 R_{mc}I_0/K)/E_0 - \gamma_2$ which will be obtained in the apparatus of FIG. 8 by changing the position of the inverter 135 by changing the coefficient $\mu R_{mc}I_0$ applied to subtraction circuit 150 to a coefficient $\gamma R_{mc}I_0$ such that $\gamma = \gamma_1/K$ and by introducing a shift $\gamma_2$ on the output signal of the processing circuit 140. The curves representing the parameter $P_7$ will be very similar to the curves of FIG. 4.

As can be seen from the above described example, the invention can have many variants. These variants of the "spherical focusing" electrode type well logging systems described in the above referenced Schuster patent. In addition to the "constant voltage $E_0$" or "constant main current $I_0$" systems represented in FIGS. 1 and 8 it is in fact possible to conceive other systems in which, for example, the auxiliary current $I_1$ would be kept constant. The first and second signals would then be respectively representative of $E_0$ and $I_0$, the resistivity being obtained by calculating $E_0I_0$ and the mudcake thickness by calculating the parameter $P'_3$ in which $I_1$ would be replaced by its constant value. It is also possible to keep the total current $(I_1 + I_0)$ constant or to maintain a relationship between $I_0$ and $E_0$ (for example $E_0I_0 =$ constant) or even a relationship between $I_1$ and $E_0$. Equivalent systems can also be obtained by a reciprocal connection of the electrodes. Other variants have to do with the choice of the detected signals ($E_0$, $I_0$, $I_1$, $V_{A_1}$, $V_{A_0}$) and with the method of calculating the parameter representative of the average thickness of the zone between the electrodes and the formations.

While there has been described what is at present considered to be a preferred embodiment of this invention, it will be obvious to those skilled in the art that various changes and modifications may be made therein without departing from the invention, and it is, therefore, intended to cover all such changes and modifications as fall within the true spirit and scope of the invention.

What we claim is:

1. An apparatus for investigating earth formations traversed by a borehole and having a mudcake layer on the borehole wall, comprising:
   a. means for supporting a plurality of electrodes adapted for movement in the borehole, the electrodes comprising at least one current-emitting electrode adapted for emitting current into the borehole and a plurality of potential measuring electrodes;
   b. means for emitting a main current, $I_0$ and an auxiliary current, $I_1$ from said current-emitting electrode;
   c. a first control loop for maintaining a first potential difference between two measure electrodes in one portion of the borehole;
   d. a second control loop for maintaining a second potential difference between two measure electrodes at a second portion of the borehole, said first and second control loops arranged to produce auxiliary current flow primarily in the borehole and mudcake formed on the borehole wall and main current flow primarily in the formation surrounding the borehole;
   e. means for producing a first signal representative of the magnitude of the main current;
   f. means for producing a second signal indicative of the magnitude of the auxiliary current;
   g. means for combining said first and second signals to produce a third signal proportional to $(I_1-\lambda I_0)$ where $\lambda$ is a constant coefficient, said third signal being representative of the mudcake thickness.

2. An apparatus for investigating earth formations traversed by a borehole comprising:
   a. means for supporting a plurality of electrodes adapted for movement in the borehole, the electrodes comprising at least one current-emitting electrode adapted for emitting current into the borehole, current return electrodes and a plurality of potential measuring electrodes;
   b. means for emitting a main current and an auxiliary current from said at least one current-emitting electrode;
   c. means for adjusting the potential difference between selected potential measuring electrodes to produce auxiliary current flow primarily in the media adjacent to the electrodes and main current flow primarily in the formation surrounding the electrodes;
   d. means for producing first and second signals representative of said main and auxiliary currents, respectively;
   e. means responsive to the signal representative of the main current for producing a third signal representative of the resistivity, $R_a$, of the formation surrounding the borehole; and
   f. means for combining said first, second and third signals to produce an output signal representative of the mudcake thickness on the borehole wall, including gate means for disabling said combining means when the ratio of the resistivity of the formation to the mudcake resistivity is less than a predetermined amount.

3. A method for investigating subsurface earth formations traversed by a borehole having a mudcake layer formed on the borehole wall, comprising:
   a. moving a plurality of electrodes through said borehole, the electrodes including at least one current-emitting electrode adapted for emitting current into the media surrounding the electrodes and a plurality of potential measuring electrodes;
   b. emitting a main and auxiliary current from said current-emitting electrode;
   c. maintaining a first potential difference between two measure electrodes in one portion of the borehole;
   d. maintaining a second potential difference between two measure electrodes in a second portion of the borehole, said first and second potential differences cooperating to produce an auxiliary current flow primarily in the borehole and mudcake on the borehole wall and main current flow primarily in the formation surrounding the borehole;
   e. measuring the main current;
   f. measuring the auxiliary current;
   g. producing a signal from the measured main current which is representative of the resistivity of the formation surrounding the borehole;
   h. comparing said signal representative of the formation resistivity with a predetermined limit value;
   i. combining said signals representative of the main, auxiliary and resistivity signals to produce a fourth signal representative of the mudcake thickness when the value of formation resistivity is greater than said predetermined limit value.

4. An apparatus for investigating earth formations traversed by a borehole comprising:
   a. means for supporting a plurality of electrodes adapted for movement in the borehole, the electrodes comprising at least one current-emitting electrode adapted for emitting current into the borehole and a plurality of potential measuring electrodes;
   b. means for supplying both survey and auxiliary currents to said current-emitting electrode for emission into the media surrounding the supporting means, said survey current returning to a first return electrode for return to the current supplying means and said auxiliary current returning to at least one return electrode located relatively near said current-emitting electrode for return to the current supply means;
   c. means for measuring the potential at a plurality of points along said supporting means;
   d. means operative in response to the measured potentials for adjusting one of the survey or auxiliary currents to set up a given potential distribution in at least a portion of the borehole whereby the auxiliary current will tend to force the survey current into the formation;
   e. means for producing first and second signals functionally related to the main and auxiliary currents $I_0$ and $I_1$, respectively; and
   f. means for combining said first and second signals to produce a third signal proportional to $(I_1-\lambda I_0)$ where $\lambda$ is a constant coefficient, said third signal being functionally related to the mudcake thickness.

5. The apparatus of claim 4 wherein said third signal is a linear function of $(I_1-\lambda I_0)$.

6. A method of measuring a characteristic of earth formations traversed by a borehole comprising:
   a. moving a plurality of electrodes through said borehole, the electrodes including at least one current-emitting electrode adapted for emitting current into the media surrounding the electrodes and a plurality of potential measuring electrodes;
   b. supplying survey and auxiliary currents to at least one of said electrodes for emission into the media surrounding the electrodes, said survey current returning to a first return electrode for return to the current supply means and said auxiliary current returning to at least one electrode which is relatively near said at least one current-emitting electrode for return to the current supply means;
   c. measuring the potential at a plurality of points along said borehole;
   d. adjusting one of said survey or auxiliary currents in response to said measured potentials to set up a given potential distribution in at least a portion of the borehole so that the auxiliary current will tend to force the survey current into the formation;
   e. producing first and second signals functionally related to said main and auxiliary currents $I_0$ and $I_1$, respectively; and
   f. combining said first and second signals to produce a third signal functionally related to $(I_1-\lambda I_0)$ where $\lambda$ is a constant coefficient, said third signal being functionally related to the mudcake thickness.

7. The method of claim 6 wherein said third signal is a linear function of $(I_1-\lambda I_0)$.

8. An apparatus for investigating earth formations traversed by a borehole comprising:
   a. means for supporting a plurality of electrodes adapted for movement in the borehole, the electrodes comprising at least one current-emitting electrode adapted for emitting current into the borehole and a plurality of potential measuring electrodes;
   b. means for supplying both survey and auxiliary currents to said current-emitting electrode for emission into the media surrounding the supporting means, said survey current returning to a first return electrode for return to the current supply means and said auxiliary current returning to at least one return electrode located relatively near said current-emitting electrode for return to the current supply means;
   c. means for measuring the potential at a plurality of points along said supporting means;
   d. means operative in response to the measured potentials for adjusting one of the survey or auxiliary currents to set up a given potential distribution in at least a portion of the borehole whereby the auxiliary current will tend to force the survey current into the formation;
   e. means for producing first and second signals functionally related to the main and auxiliary currents $I_0$ and $I_1$, respectively;
   f. means for producing a third signal functionally related to the resistivity, $R_a$, of the formation surrounding the borehole; and
   g. means for combining said first, second and third signals to produce an output signal representative of the mudcake thickness $H_{mc}$ according to the expression:

$$H_{mc} = K_1 (A-K_2) \alpha$$

where:

$$A = \frac{\frac{I_1}{I_0} - K_3}{\frac{R_a}{R_{mc}} - K_4}$$

and
$K_1$ through $K_4$ and $\alpha$ are predetermined constants,
$R_{mc}$ is a predetermined constant representative of the mudcake resistivity.

9. A method of measuring a characteristic of earth formations traversed by a borehole comprising:
   a. moving a plurality of electrodes through said borehole, the electrodes including at least one current-emitting electrode adapted for emitting current into the media surrounding the electrodes and a plurality of potential measuring electrodes;
   b. supplying survey and auxiliary currents to at least one of said electrodes for emission into the media surrounding the electrodes, said survey current returning to a first return electrode for return to the current supply means and said auxiliary current returning to at least one electrode which is relatively near said at least one current-emitting electrode for return to the current supply means;
   c. measuring the potential at a plurality of points along said borehole;

d. adjusting one of said survey or auxiliary currents in response to said measured potentials to set up a given potential distribution in at least a portion of the borehole so that the auxiliary current will tend to force the survey current into the formation;

e. producing first and second signals functionally related to said main and auxiliary currents $I_0$ and $I_1$, respectively;

f. producing a third signal functionally related to the formation resistivity, $R_a$, of the formation surrounding the borehole; and g. combining said first, second and third signals to produce an output signal representative of the mudcake thickness $H_{mc}$ according to the expression:

$$H_{mc} = K_1 (A-K_2)^\alpha$$

where:

$$A = \frac{\frac{I_1}{I_0} - K_3}{\frac{R_a}{R_{mc}} - K_4}$$

and $K_1$ through $K_4$ and $\alpha$ are predetermined constants, $R_{mc}$ is a predetermined constant representative of the mudcake resistivity.

10. An apparatus for investigating earth formations traversed by a borehole comprising:

a. means for supporting a plurality of electrodes for movement in the borehole, the electrodes comprising at least one current-emitting electrode adapted for emitting current into the borehole and a plurality of potential measuring electrodes;

b. means for supplying both survey and auxiliary currents to said current-emitting electrode for emission into the media surrounding the supporting means, said survey current returning to a first return electrode for return to the current supply means and said auxiliary current returning to at least one return electrode located relatively near said current-emitting electrode for return to the current supply means;

c. means for measuring the potential at a plurality of points along said supporting means;

d. means operative in response to the measured potentials for adjusting one of the survey or auxiliary currents to set up a given potential distribution in at least a portion of the borehole whereby the auxiliary current will tend to force the survey current into the formation;

e. means for producing first and second signals functionally related to the main and auxiliary currents, $I_0$ and $I_1$, respectively;

f. means responsive to the signal functionally related to the main current for producing a third signal representative of the resistivity, $R_a$, of the formation surrounding the borehole; and g. means for combining said first, second and third signals to produce an output signal representative of the mudcake thickness on a borehole wall, including gate means for disabling said combining means when the ratio of the resistivity of the formation to the mudcake resistivity is less than a predetermined amount.

11. A method for investigating earth formations traversed by a borehole comprising:

a. supporting a plurality of electrodes for movement in the borehole, the electrodes comprising at least one current-emitting electrode adapted for emitting current into the borehole and a plurality of potential measuring electrodes;

b. supplying both survey and auxiliary currents to said current-emitting electrode for emission into the media surrounding the supporting means, said survey current returning to a first return electrode for return to the current supply means and said auxiliary current returning to at least one electrode located relatively near said current-emitting electrode for return to the current supply means;

c. measuring the potential at a plurality of points along said supporting means;

d. adjusting one of the survey or auxiliary currents in response to the measured potentials to set up a given potential distribution in at least a portion of the borehole whereby the auxiliary current will tend to force the survey current into the formation;

e. producing first and second signals functionally related to the main and auxiliary currents $I_0$ and $I_1$, respectively;

f. producing a third signal responsive to the signal functionally related to the main current representative of the resistivity, $R_a$, of the formation surrounding the borehole; and g. combining said first, second and third signals to produce an output signal representative of the mudcake thickness on a borehole wall, including the step of producing a fourth signal representative of the ratio of the resistivity of the formation to the mudcake resistivity and not combining said first, second and third signals when said fourth signal is less than a predetermined amount.

12. An apparatus for investigating earth formations traversed by a borehole comprising:

a. means for supporting a plurality of electrodes adapted for movement in the borehole, the electrodes comprising at least one current-emitting electrode adapted for emitting current into the borehole and a plurality of potential measuring electrodes;

b. means for emitting a main current and an auxiliary current from said at least one current-emitting electrode;

c. means for measuring the potential at a plurality of points along said supporting means;

d. means operative in response to the measured potentials for adjusting one of the survey or auxiliary currents to set up a given potential distribution in at least a portion of the borehole whereby the auxiliary current will tend to force the survey current into the formation;

e. means for producing first and second signals functionally related to the potential differences measured between separate points in the borehole wall, $V_a$ and $E_0$, respectively; and f. means for combining said first and second signals to produce a third signal functionally related to the mudcake thickness on the borehole wall, said third signal being a function of:

$$V_a - K/E_0$$

where K is a constant.

13. A method for investigating earth formations traversed by a borehole comprising:
 a. supporting a plurality of electrodes adapted for movement in the borehole, the electrodes comprising at least one current-emitting electrode adapted for emitting current into the borehole and a plurality of potential measuring electrodes;
 b. means for emitting a main current and an auxiliary current from said at least one current-emitting electrode;
 c. measuring the potential at a plurality of points along said supporting means;
 d. adjusting one of the survey or auxiliary currents in response to the measured potentials to set up a given potential distribution in at least a portion of the borehole whereby the auxiliary current will tend to force the survey current into the formation;
 e. producing first and second signals functionally related to the potential differences measured between separate points in the borehole, $V_A$ and $E_0$, respectively; and
 f. combining said first and second signals to produce a third signal functionally related to the mudcake thickness on the borehole wall, said third signal being a function of:

$$V_a - K/E_0$$

where K is a constant.

* * * * *

UNITED STATES PATENT OFFICE
CERTIFICATE OF CORRECTION

Patent No. 3,973,188  Dated August 3, 1976

Inventor(s) Georges Attali, Pierre Grimaldi

It is certified that error appears in the above-identified patent and that said Letters Patent are hereby corrected as shown below:

In the first page, insert the following:

-- Applicant claims right of priority based upon French Patent Application Serial No. 72.13575 filed April 18, 1972 --.

In the first page, paragraph [73] delete "Schlumberger Limited, New York, New York" insert -- Schlumberger Technology Corporation, New York, N. Y. --.

Signed and Sealed this

Twenty-eighth Day of February 1978

[SEAL]

Attest:

RUTH C. MASON  
Attesting Officer

LUTRELLE F. PARKER  
Acting Commissioner of Patents and Trademarks